July 24, 1962 L. R. AMBROSINI 3,045,650
FLUID ACTUATING DEVICE
Filed Dec. 23, 1957
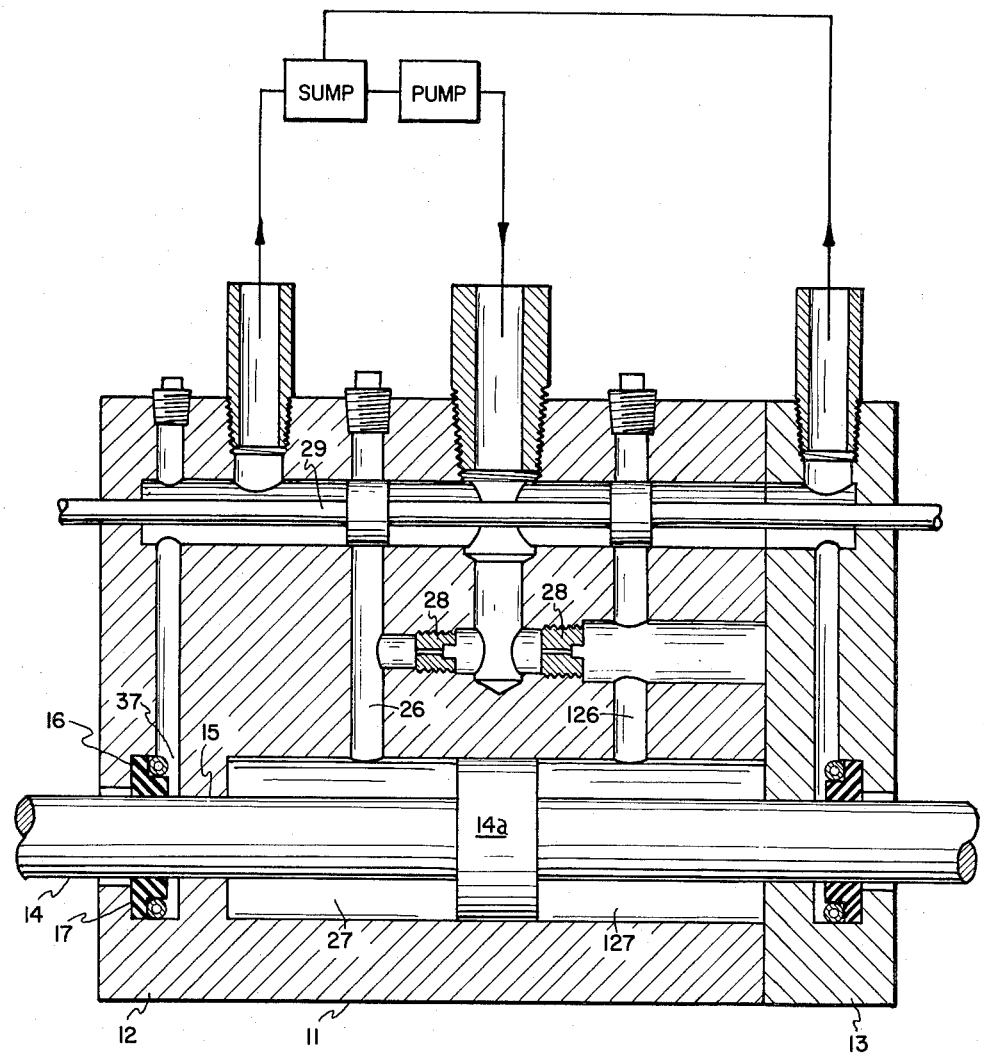
INVENTOR.
LEONARD R. AMBROSINI
BY Harold J. Downes
ATTORNEY 3,045,650
FLUID ACTUATING DEVICE
Leonard R. Ambrosini, Grand Rapids, Mich., assignor to Lear, Incorporated
Filed Dec. 23, 1957, Ser. No. 704,727
4 Claims. (Cl. 121—38)

This invention relates to a fluid actuated device and, more particularly, to means for effecting a substantial reduction of friction between relatively moving parts, for example, a piston rod extending through the wall of a cylinder.

It is well known in the art of hydraulic cylinders having a piston rod movably mounted in the wall of the cylinder and connected to a piston to actuate or be actuated by a fluid, that static and other friction must be overcome or substantially reduced in order to move the rod relative to the wall. In the past, designers have attempted to solve this problem by supplying sufficient force to overcome the static and other frictions to obtain movement of the rod relative to the wall through which it extends.

One of the objects of the present invention is to reduce substantially the static and other frictions between the rod and the wall so that relative movement therebetween may be obtained.

Another object of the present invention is to provide a fluid actuated device having a reciprocally movable piston rod which is substantially free of static friction.

Other objects and a fuller understanding of the invention will become apparent from the following description of a preferred embodiment of the invention when taken in conjunction with the attached drawing which illustrates in cross-section the construction of the invention.

In accordance with the present invention there is provided a fluid operated device having a housing divided by a wall to provide a high pressure chamber and a low pressure chamber. Positioned in the high pressure chamber is a piston having a piston rod extending through the wall and the low pressure chamber and out of the housing for connection to any device to be actuated by the fluid operated device. There is also provided a seal between the housing and the piston rod, the seal being responsive to pressure of fluid in the low pressure chamber to seal against leakage of fluid from the housing and about the pitson rod. Fluid to operate the piston and move it is directed into the high pressure chamber by suitable inlet means, the fluid being allowed to leak through the wall around the pitson rod into the low pressure chamber. From the low pressure chamber, the fluid may return to a fluid reservoir by a suitable outlet.

Referring directly to the drawing for a more detailed description of my invention and the advantages thereof, there is illustrated a hydraulic ram in which a cylinder 11, which may be stationary, is provided with an end 12 and end 13. Positioned within cylinder 11 is piston rod 14 having a piston head 14a which may be hollow or solid as desired. Near the end 12 of cylinder 11 is positioned a wall or guide 15, and adjacent the guide 15 is a shoulder 16 defined by the housing or cylinder and on which a seal or other suitable packing annulus 17 is positioned. The packing annulus 17 may be a resilient material applying a light pressure to the rod 14. It can be seen that the pressure of the fluid against the packing annulus 17 determines the pressure the packing annulus 17 exerts on the rod 14 over and above the initial fitting. The structure of end 13 of cylinder 11 is similar to that of end 12 and therefore is not described in detail herein.

The wall 15 and shoulder 16 have a dimensional relationship with piston rod 14 in that the internal surface diameter of wall 15 is a diameter registering closely with and at least as large as the diameter of piston rod 14. In actual construction, the wall 15 is as close to the size of rod 14 as manufacturing tolerances will permit and fluid will leak through the space between the internal surface and rod.

Thus, there are two chambers at two pressures on opposite sides of wall or guide 15, namely, chamber 27, and a chamber 37 which is between wall 15 and shoulder 16. Chamber 37 is provided with an outlet so that the pressure therein is always very low compared to the inlet pressure in chamber 27. In practical applications, the chamber 37 is connected to a storage tank maintained at atmospheric pressure. Any fluid leaking through wall 15 and around rod 14 is compensated for by means of a by-pass 28 around the valve control portion 29 of the device, if desired, or the valves may be suitably designed to compensate therefor.

The fluid for moving or actuating piston 14 in opposite directions may be pumped through either of the inlets 26 or 126 and into the respective cylinder space 27 or 127. These cylinder spaces are on opposite sides of the piston head 14a, as is well known in the art.

It will be seen, therefore, that I have provided a simple, single seal element which forms a fluid-tight seal between the cylinder and the piston rod and which can be readily and inexpensively manufactured. Furthermore, due to the fact that the seal is not subjected to the high pressures of the fluid in the chamber inclosing the piston head, there is practically no static friction between the seal and piston rod to be overcome upon initiating movement of the piston.

Although the present invention has been described with a certain degree of particularity, it is understood that various modifications in the details and arrangements of parts may be had without departing from the spirit and scope of the invention as hereinafter claimed.

I claim:

1. In combination, a fluid actuated device comprising a housing having a first chamber and a second chamber therein, a rigid partition between said first and second chambers, said second chamber having a wall member in spaced apart relationship to said rigid partition, a rod adapted for executing reciprocal motion passing through a first opening in said rigid partition and through a second opening in said wall member, wherein the outside diameter of said rod is slightly smaller than the inside diameter of said first opening, and a flexible sealing means contacting the peripheral surface of said rod and positioned adjacent said wall member so as to provide a fluid seal to retain fluid within said second chamber, a piston mounted on said rod in said first chamber, a sump, valve means for controlling the exhaust of fluid from said first chamber, a passage connecting said valve means to said sump, said second chamber being freely open to and connected to said sump by said last-mentioned passage.

2. The combination as claimed in claim 1 wherein said flexible means comprise a resilient packing annulus and a retaining ring capable of holding said packing annulus in position adjacent said wall.

3. The combination as claimed in claim 1 wherein said wall around said second opening has a recessed area to accommodate said resilient seal.

4. The combination as claimed in claim 1 further comprising a retaining ring and wherein said second opening in said wall has a recessed area to accommodate said flexible sealing means, said retaining ring is capable of holding said flexible seal means adjacent said wall member.

(References on following page)

References Cited in the file of this patent

UNITED STATES PATENTS

| | | |
|---|---|---|
| 339,771 | Hennebohle | Apr. 13, 1886 |
| 580,049 | Heim | Apr. 6, 1897 |
| 639,744 | Leavitt | Dec. 26, 1899 |
| 722,219 | Fielden | Mar. 10, 1903 |
| 725,254 | Jankin | Apr. 14, 1903 |
| 726,953 | Lentz | May 5, 1903 |
| 728,124 | Mitchell | May 12, 1903 |
| 803,260 | Wittenmeier | Oct. 31, 1905 |
| 1,258,218 | Hicks | Mar. 5, 1918 |
| 1,643,971 | Wishart | Oct. 4, 1927 |
| 1,842,725 | Link | Jan. 26, 1932 |
| 2,000,265 | Vickers | May 7, 1935 |
| 2,259,361 | Vorkauf | Oct. 14, 1941 |
| 2,761,425 | Bertsch et al. | Sept. 4, 1956 |
| 2,882,869 | Krapf | Apr. 21, 1959 |